May 2, 1961
CHRISTIAN-MARIE-LUCIEN-LOUIS BOURCIER DE CARBON
2,982,538
SHOCK ABSORBERS
Filed Feb. 11, 1957
4 Sheets-Sheet 1
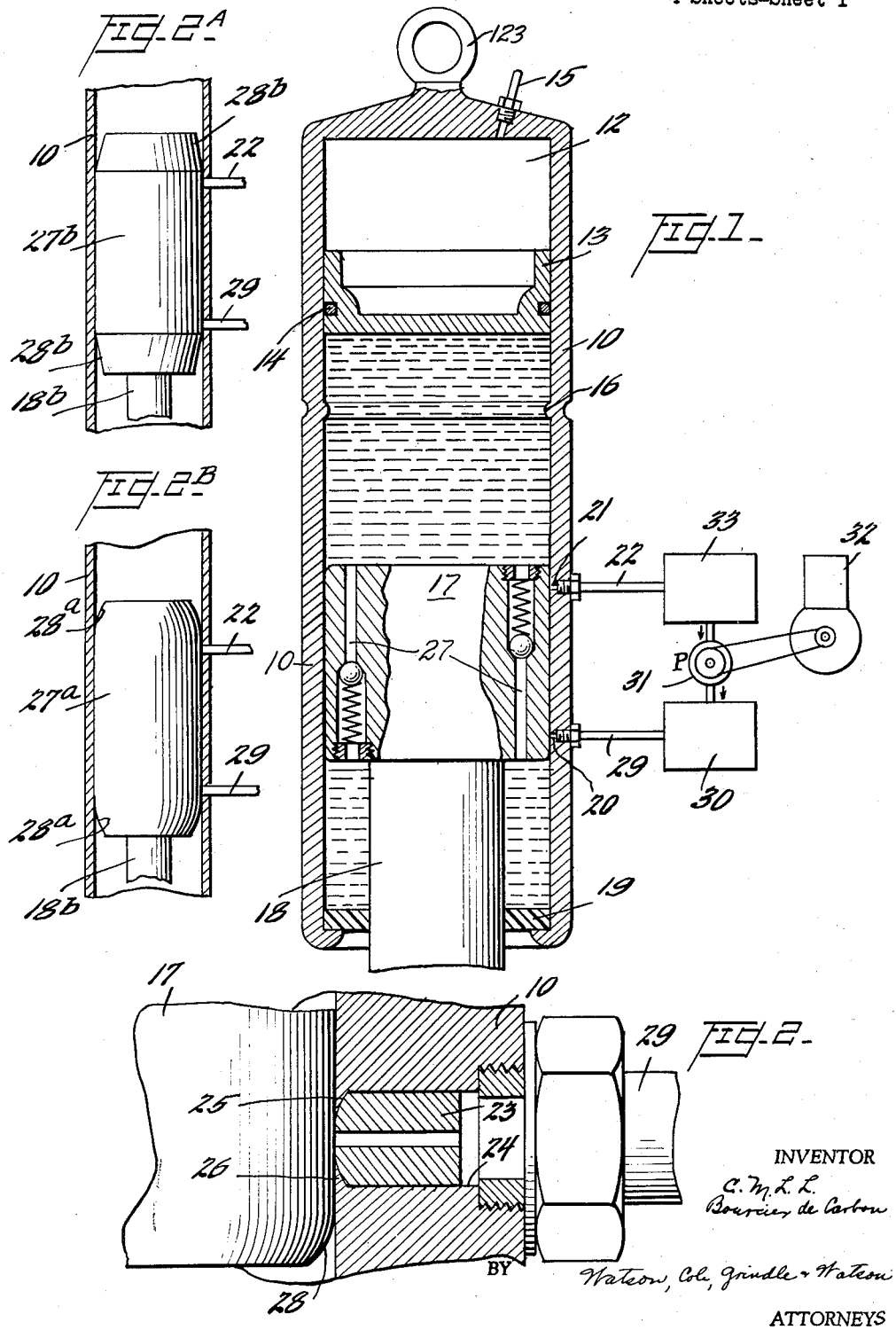
INVENTOR
C. M. L. L.
Bourcier de Carbon
BY Watson, Cole, Grindle & Watson
ATTORNEYS

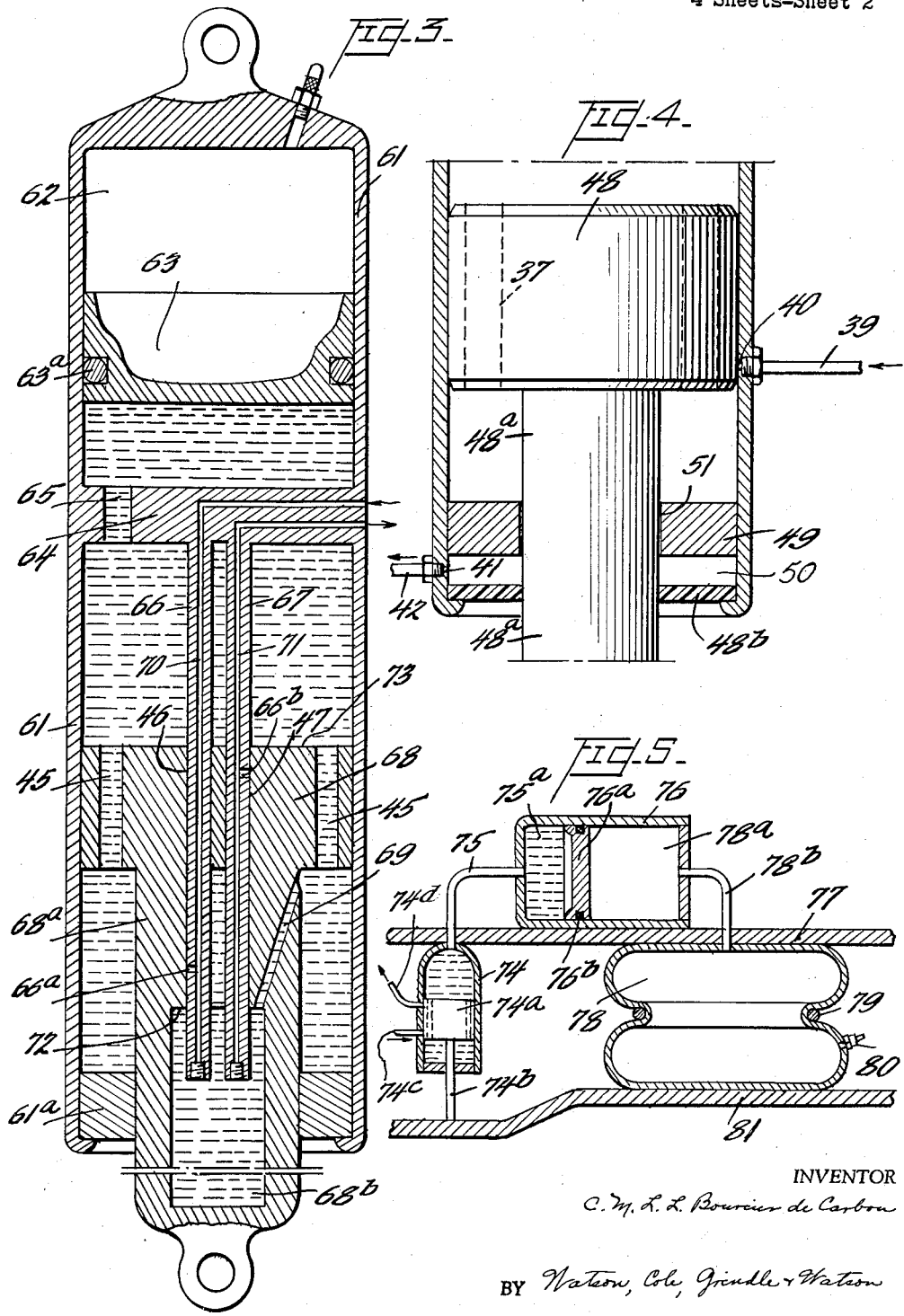

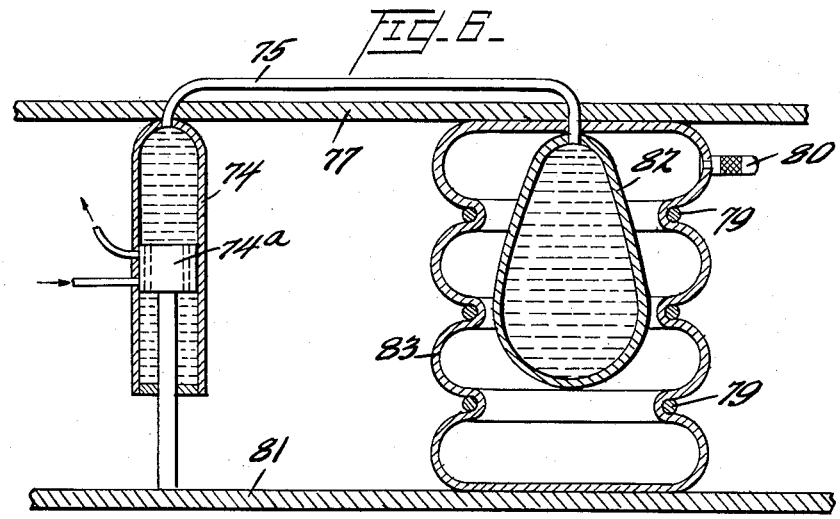
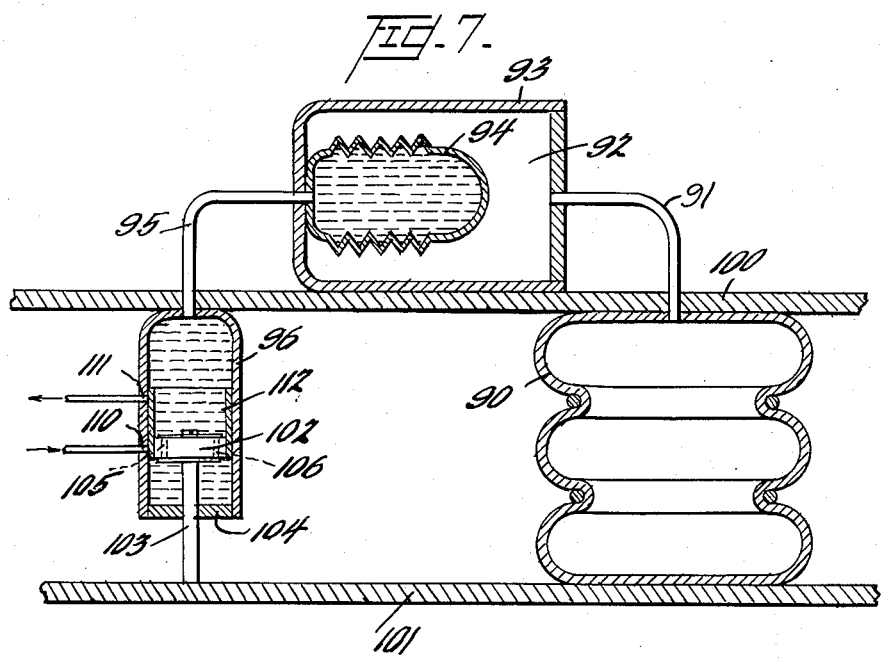

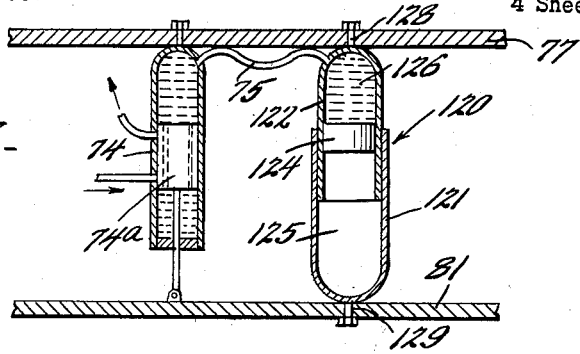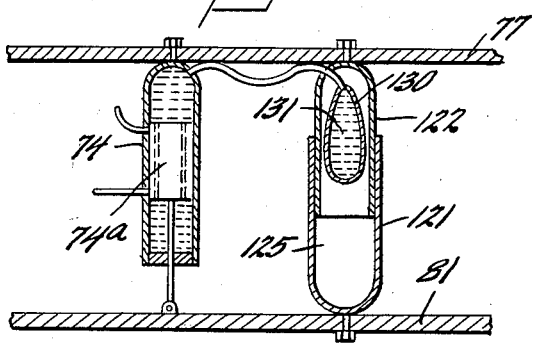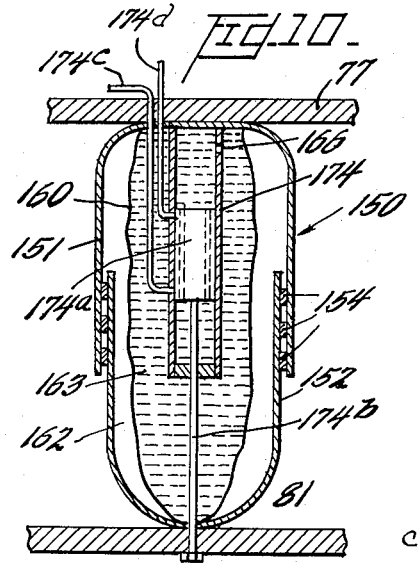

2,982,538

SHOCK ABSORBERS

Christian-Marie-Lucien-Louis Bourcier de Carbon, 64 Blvd. Maurice-Barres, Neuilly-sur-Seine, France Filed Feb. 11, 1957, Ser. No. 639,574

Claims priority, application France Feb. 15, 1956

10 Claims. (Cl. 267—64)

This invention relates to suspension devices for vehicles or other installations which involve a body movable in relation to its support, and the invention has for its general object the provision of novel and improved resilient suspension devices with which are associated fluid means for controlling the action of such devices.

Within the scope of the broadest aspects of the invention the resilient suspension proper may be either mechanical, pneumatic, or hydraulic. However, in the preferred embodiment, the invention contemplates the provision of a basically pneumatic suspension, and the preferred controlling and regulating medium is hydraulic.

In certain adaptations of the principles of the invention, the function of the resilient supporting spring is performed by a pressurized body of gas contained in an enclosure of variable volume, the variations in volume being controlled by the force of a liquid medium contained in a system wherein the liquid medium is subject to a predetermined maximum pressure, and said force brought into operative effect on the gaseous fluid enclosure at such times and in such degress as may be determined by the relative positioning of the supporting and supported bodies in accordance with the load sustained.

The hydraulic controlling or distributing member of the novel suspension system may take the general form of a direct-acting reciprocating shock absorber, comprising a cylinder in which a piston moves within the body of hydraulic working fluid; the piston-and-cylinder distributor may be interposed between the supporting and supported members, either in series or in parallel with the pneumatic or other resilient "spring"; and the entire assemblage may function as a combined suspension spring, shock absorber, and trim or level corrector, assuming that independent installations are employed for each of several points of support of the principal body, as in the case of independent wheel suspensions of motor vehicles.

Typically, a distributor of this character may comprise a cylinder, a piston disposed for reciprocation in the cylinder, a source of working liquid under pressure higher than that encountered in the pneumatic "spring," and conduits providing for introduction and evacuation of pressure liquid to and from the cylinder at points spaced apart in an axial direction, which spacing is somewhat shorter than the effective height of the piston in its substantially close running fit with respect to the cylinder or certain fixed structure associated with the cylinder. The pressure liquid connections may be through the cylinder wall or through supplemental guide structure passing through the piston. The pressure liquid may be supplied by a pump driven by any suitable form of power take-off from the engine of the motor vehicle to which the device may be applied.

In the preferred constructions, the piston of the distributor is smooth-walled and free of any peripheral packing, and it is also preferably provided with means for passage of working liquid therethrough from one part of the working chamber of the cylinder to the other. In fact, passageways through the piston may be provided which are spring-valve controlled for damping the liquid flow as in the shock absorber disclosed in my prior patents, among which may be mentioned United States Patents Nos. 2,719,612, 2,721,074, 2,748,898, United States application Ser. No. 398,594, and French Patent 1,104,016 and Addition No. 58,079. In cases where the cylinder-piston member comprises a part of the suspension proper, the piston rod is of increased diameter as compared with a conventional shock absorber.

In certain variations of the present invention, means are provided for the evacuation of the liquid in the form of a constant leakage which causes the suspended member to descend at a constant speed. The input of pressurized liquid (which occurs when the depression of the member attains or surpasses a certain amount) is effected at a rate greater than that of the constant leakage, which ensures the desired positional equilibrium. One way of providing for such a leak is to cause the piston rod, for example, to pass with extremely slight clearance through a partition or guide plate extending across the cylinder near one end thereof and spaced axially from the packed opening in the end of the cylinder through which the piston rod extends. In this way, the piston rod packing or seal is protected from the stress of extremely high internal pressure, and operates under better conditions of efficiency since it has only to fulfill the function of a simple wiper not subjected to high pressure.

The present invention also envisages forms of construction in which the cylinder-piston assemblage comprises merely the standard hydraulic shock absorber which is not subject to load. The function of the suspension spring is filled by a pneumatic pocket interposed between the chassis of the motor vehicle and the axle, the gaseous pressure prevailing inside such pocket being automatically determined by a hydraulic discharge controlled by the shock absorber, whereby variations of stability or trim resulting from variations in load, may be corrected. In this embodiment, the hydraulic liquid does not transmit the resilient reaction to the wheel and the chassis, but serves only the purpose of varying the available volume of compressed air which latter has the function of the supporting medium. Specifically, the pneumatic spring may consist of a pocket connected to a cylinder which has a movable partition or diaphragm separating a space which communicates with the inside of the pocket from a space filled with liquid which communicates with the cylinder-piston assembly. In still another variation, the pocket forming the pneumatic spring may have disposed inside of it, a second pocket made of flexible material and filled with liquid from the cylinder-piston element.

Other modifications include the provision for each wheel of the vehicle of a conventional metallic spring and a pneumatic spring comprising an air pocket, these two members being mounted in series and the air pocket being subject to regulation as described as a function of the load of the vehicle. Also, the gas pressure in the pneumatic spring devices already described can be decreased by the addition, in parallel, for each wheel, of a conventional metallic spring or pneumatic spring, the bearing force of which remains equal to or slightly less than the weight of the suspended portion of the vehicle when empty, so that the suspension of variable supporting force need only compensate for variations in load.

Further, in connection with the devices described, there may be combined instrumentalities which make it possible for the operator to close at will the inlet conduit or conduits for the liquid under pressure, as well as the evacuation conduits, this arrangement making it possible after the adjustment in accordance with the load has been effected to continue to drive without having to make use of the device for the adjustment of the bearing force.

In order to decrease the consumption of oil under pressure and therefore economize power, one can use a single device for the two wheels on the same axle for controlling the feeding of liquid under pressure, the pressure containers for the two wheels and preferably the hydraulic containers being in communication with each other, and a suitable anti-rolling device being provided in the suspension installation.

Another novel detail of the invention involves the provision of a movable nozzle head disposed in the inlet and outlet orifices of the controlling liquid conduits as they enter and leave the cylinder.

In further embodiments of the invention, a conventional shock absorber acts as a distributor, even simplified by the elimination of the usual compensation or cavitation chamber. In fact, communication between this shock absorber-distributor and the body of load-compensating liquid can advantageously be controlled by a suitable valve device similar to that used in shock absorbers between the working chamber and the compensation chamber. For instance, this communication may have the flow of liquid toward the compensation chamber pass through a constantly open calibrated orifice and the return flow through other passageways controlled by valves such as thin leaf spring valves.

Other objects and features of novelty will be apparent from the following specification when read in connection with the accompanying drawings in which several embodiments of the invention are illustrated by way of example.

In the drawings:

Figure 1 is a vertical transverse sectional view of a suspension embodying the principles of the invention;

Figure 2 is an enlarged detail sectional view of one of the controlling fluid connections with the cylinder of the distributor;

Figures 2A and 2B are somewhat diagrammatic views showing optional tapering of the ends of the operating piston in the controlling distributor;

Figure 3 is a view similar to Figure 1 showing a modified embodiment in which the controlling liquid is supplied axially of the piston rather than peripherally;

Figure 4 is a fragmentary vertical sectional view of the lower end of the cylinder-piston combination of one form of distributor;

Figure 5 is a diagrammatic vertical sectional view through the several elements of a suspension system according to the invention in which the pneumatic suspension spring is separate from the controlling cylinder-piston assembly;

Figure 6 is a similar view showing a modified form of suspension;

Figure 7 is a view similar to Figures 5 and 6 showing a still further adaptation of the principles of the present invention;

Figure 8 is a view in vertical section of a modified arrangement in which the pneumatic spring combination comprises telescoping cylinders with a floating partition;

Figure 9 is a similar view of an equivalent arrangement in which a pressure liquid sac is disposed within the telescoping cylinders; and Figure 10 is a similar view showing an arrangement wherein the pressure controlling cylinder-and-piston assembly is incorporated within the pneumatic spring.

In the embodiment of the invention illustrated in Figures 1 and 2 of the drawings, the suspension proper and the controlling or distributing device are united in one casing which comprises the cylinder 10, in the upper portion of which is enclosed a cushioning body of compressed gaseous fluid 12 bounded by the movable partition 13 which may freely reciprocate within the cylinder, a suitable leakproof seal 14, of rubber or similar appropriate material, being provided to prevent contact between the gaseous fluid 12 and the controlling liquid occupying the lower portion of the cylinder 10.

The upper end of the cylinder is provided with any suitable means such as the eye 123 for attaching it to a suitable portion of the supported body, such as a vehicle chassis. A valve 15 may be provided for filling the upper portion of the cylinder with compressed gas.

Any sort of abutment such as the annular rib 16 may be provided within the cylinder for limiting the downward movement of the floating partition 13 and also, if necessary, the upward movement of the piston 17.

The piston 17 is fixed to the upper end of the piston rod 18 which passes through a leakproof seal 19 which is shown in Figure 1 in a purely diagrammatic fashion and may comprise plastic or other sealing means such as illustrated and described in certain of my United States patents, for example, Nos. 2,719,612 and 2,765,877.

It is of course known that the cross-sectional area of shaft 18, which may be designated S, and the pressure P to be maintained in the gas chamber 12, are calculated in terms of the load F to be supported, according to the following equation:

$$F = P.S$$

The cylinder walls, in this embodiment, are provided with two orifices 20 and 21, the orifice 20 accommodating the entry of the pressure liquid and the orifice 21 serving for its evacuation from the cylinder. The supply of pressure liquid is assured through conduit 29 from any suitable source such as a pressurized reservoir 30 fed by a pump 31 which may be driven by the vehicle engine indicated diagrammatically at 32. A conduit 22 leads from the outlet orifice 21 to a reservoir 33 from which the pump 31 may draw the liquid in order to send it back to the pressure reservoir 30. Thus, the pressure liquid passes through a closed circuit, any suitable valving arrangements being provided to control the flow for the purposes indicated.

There is no leakproof seal between the piston 17 and the wall of the cylinder 10, and the clearance space between piston 17 and the cylinder wall should be as small as possible, for instance about ten hundredths of a millimeter. The orifices 20 and 21 should also be very small, for instance about 0.5 millimeter in diameter, so as to limit the quantity of pressurized oil necessary to supply the system. For the same reason, the oil used should be very viscous, for instance about 1 poise at 15° C. Also, for a normal load of 300 kilograms, a piston rod with a section of fifteen square centimeters and a pressure of twenty kilograms per square centimeter in the chamber 12 may be adopted, the pressure attaining thirty kilograms per square centimeter when the load attains 450 kilograms. Under these conditions, the supply pressure of the liquid through orifice 20 may be about forty kilograms per square centimeter.

The two orifices 20 and 21 are separated axially by a distance $d$ which is less than the effective height $h$ of the piston, the margin of free movement on each side of the middle position of the piston being $$\frac{h-d}{2}$$

For reasons of economy of fluid consumption, it is desirable that this margin should not be too small. For a piston with a height of 110 millimeters, the margin may be about fifteen millimeters or even more.

In this embodiment of the invention the orifice 20 may be made leakproof by disposing it within a reciprocating plug or nipple 23 which occupies a bore 24 in the wall of the cylinder 10, as clearly shown in Figure 2 of the drawings. The movable part 23 terminates inwardly in a rounded or conical end surface 25, which may contact the wall surface of the piston 17 and press against the corresponding surface 26 formed in the cylinder wall 10. The high pressure of the control liquid keeps the surface 25 of plug 23 in close contact with the piston 17. An equivalent arrangement may be adopted for the evacuation orifice 21.

Passageways 27 are provided through the piston 17 to permit the passage of liquid from one side of the piston to the other.

The side surfaces of the piston may also terminate in a curvature such as shown at 28 in Figure 2 of the drawings, thus forming a sort of throat to facilitate engagement when the piston is contacting the rounded end surfaces 25 of the plugs or nipples 23. An even more tapering piston end of this same rounded nature is indicated at 28a in Figure 2B as applied to the piston 27a. A conical taper is shown at 28b on the piston 27b in Figure 2A.

Operation of the device thus described is as follows. When the chassis of the vehicle, which is assumed to be the supported body in these disclosures, is moved downwardly with respect to the wheel support, for example, under the effect of an overload or of centrifugal force encountered on turning, the cylinder 10 is also moved downwardly with respect to the piston 17 until the orifice 20 is uncovered. The control liquid under high pressure then penetrates through the orifice 20 into the cylinder below the piston and the pressure rises on both sides of the piston by virtue of the communicating passageways 27, at the same time compressing the gaseous body 12. The increase of pressure, whereby the gaseous body 12 is compressed, brings the piston back to its original position and a new equilibrium is thus established.

If, on the contrary, the chassis moves upwardly with respect to the axle, the cylinder moves upwardly with relation to the piston 17, uncovering orifice 21 and producing the opposite effect, the liquid being evacuated through the conduit 22 toward the reservoir 33 where it may be again taken up by the feed pump.

In short, within the zone of equilibrium the two orifices of entry and evacuation are simultaneously covered; when there is compression, however, the entry orifice is uncovered and the evacuation orifice covered. When there is extension, on the other hand, the evacuation orifice is uncovered and the entry orifice is covered. Thus, at least one of the two orifices is covered whatever the position of the piston.

The piston 17 as thus far described, may be modified by providing the passages 27 therein with valving or by establishing laminar passage of liquid, so as to obtain the damping effects described in my previous patents, notably United States Patents Nos. 2,719,612 and 2,748,898.

In this way, the unique apparatus thus constructed ensures both the effect of a pneumatic spring, due to the gas chamber 12, the effect of correcting trim for load variations, and the effect of hydraulic damping.

Also, the illustrated form of construction of the gas chamber 12 may be replaced by certain equivalent arrangements. Thus, it may consist of a fixed capacity, whether cylindrical or not, having a different diameter than the working chamber. The two fluids may be separated by other means than a hermetic piston or partition, for example, by a membrane or flexible diaphragm.

In the embodiment illustrated in Figure 3 of the drawings, the cylinder 61 has, as in the previous embodiment, a movable partition or floating piston 63 separating the compressed air chamber 62 from the control or regulating liquid. This floating piston may be provided with packing as indicated at 63a. Obviously, the movable partition may be replaced by a flexible diaphragm if desired.

A fixed partition 64 is provided transversely of the cylinder 61 and, although it is shown as integrally formed in this diagrammatic view, it may obviously be constructed in any suitable way having due regard for known casting, machining, and welding processes. This stationary partition 64 is provided with one or more passageways 65 extending therethrough and two parallel rods 66 and 67 depend downwardly from the partition and cooperate with the piston in a manner to be described.

The piston which forms the mating part of the suspension in this embodiment is designated 68 and has a hollow piston rod 68a depending therefrom and extending through packing in the lower end of the cylinder 61 as diagrammatically shown at 61a. The piston rod 68a is of hollow construction, containing a liquid chamber 68b.

The piston itself is drilled to provide a series of passageways 45 serving to by-pass fluid from one side of the piston to the other. The piston 63 is also provided upon either side of its axis with a pair of narrow bores 46 and 47 in which extend respectively, with very slight sliding clearance, the rods 66 and 67 depending from the fixed partition 64. Ducts 70 and 71 are drilled through the rods 66 and 67 and from these ducts respectively lead the openings 66a and 66b. The lower ends of the ducts 70 and 71 are plugged in any suitable manner. The liquid chamber 68b in the hollow piston rod being in two sections of different diameters, is formed with an internal shoulder as shown at 72, and from beneath this shoulder lead one or more passageways 69 to connect the chamber 68b with the working chamber of the cylinder 61 beneath the piston.

As in the previously described embodiment, the axial distance between the upper and lower openings 66b and 66a is shorter than the distance between the upper face 73 of the piston 68 and the shoulder 72 so that at all times at least one of the openings 66a or 66b is rather closely covered by the internal wall of the piston and piston rod structure.

It can be readily seen that the operation of this embodiment is the same as that of the previously described one, but has the advantage of permitting a longer stroke, greater precision in the operation of the injection and evacuation system, and a decrease in wear.

Damping can be effected by controlling the passage of liquid either through controlling the flow through the passageways 45 in the piston 68 or the passageways 65 in the fixed piston 64. Valves may be applied to these passageways in the same manner as they are employed in the shock absorbed pistons particularly such as described in my United States Patent No. 2,748,898 and my French Patent No. 1,104,016.

The modification shown in Figure 4 illustrates somewhat diagrammatically the case in which a permanent liquid leak is provided, not at the height of the piston itself but at the lower end of the cylinder. The piston, designated 48, has a rod indicated at 48a which passes through an opening 51 in a guide ring 49 of any suitable configuration, with very slight clearance which, however, is sufficient to assure a permanent flow which is substantially constant as a result of the pressure present in the cylinder. The clearance diameter, with oils of the viscosity generally employed in devices of this type, will be for example from 3–8 hundredths of a millimeter for an internal pressure of the order of thirty to sixty kilograms. Due to the loss in head resulting from the passage through this opening, the liquid reaches the space 50 without any substantial pressure, from which space it is returned to the delivery pump through the orifice 41 and the conduit 42. The liquid of course is introduced through the orifice 40 by means of the pipe 39. The space 50 is just above the sealing element 48b which may be of any suitable nature. In fact, due to the low pressure of the body of liquid at 50, the liquid-tightness of the packing of the piston rod 48a by the means 48b is so improved that it is possible to establish it in such manner that the bearing pressure against the rod is very low, which further improves the comfort and efficiency of the suspension by reducing the friction on the joint and decreasing the wear.

The guide member 49 for the piston rod can be of any shape and of any suitable material, for example, it may be made of fritted or powdered metal, but it will preferably be rather thick, for instance, several centimeters in height, in order to reduce the rate of the functional leak as much as possible.

The permanent annular passageway 51 could be supplemented by auxiliary passageways provided in the body of the guide partition 49 for the piston rod. The guiding of the rod could also be effected by a packed joint without substantial play instead of the guide partition 49, with a permanent communication of any type assuring the passage of liquid into the chamber 50 with a sufficient loss of head so that the pressure is practically zero. This conception also includes all variants under the scope of the present invention in which a container such as that indicated at 50, arranged with respect to the sealing joint on the inner side of the cylinder, collects any liquid leaks which arrive there under very low pressure, this liquid being evacuated from that point to the pump.

It is furthermore possible, in accordance with the present invention, to combine the above described arrangement with the liquid return controlled by the piston itself as shown in Figure 1 of the drawings.

In the first described embodiments of the invention, it has been contemplated that the entire load of the suspended part of the vehicle is to be supported by the novel suspension device. This arrangement, however, has one possible drawback that in the case of failure of the pump or for other reasons pressure on the controlling liquid would be removed and the vehicle would be deprived of any elastic suspension. One of the improvements which is the subject matter of the invention consists of provisions for overcoming this possible drawback by combining with the cylinder and piston controlling member a permanent spring which may be either a conventional metal spring or a pneumatic spring, the supporting force of which corresponds to the average weight, without load, of the suspended part of the vehicle, the cylinder and piston member then having to supplement such a permanent spring only with respect to the variable load. This solution of the problem, in addition to assuring greater safety in case of breakdown, makes it possible to use lower pressures in the liquid medium of the cylinder and piston controlling or distributing member.

In Figure 5, an example of the combination of such a cylinder and piston controller or distributor with a pneumatic spring of the air pocket type is disclosed. The cylinder 74 in this embodiment does not contain a gas chamber but is otherwise equipped as in the case of the previous embodiments with a piston 74a having a rod 74b and inlet and outlet fluid connections 74c and 74d, but the upper end of the cylinder is connected by means of the conduit 75 with the end of the cylinder 76 supported in any suitable fashion upon the chassis of the motor vehicle indicated diagrammatically at 77. Within the cylinder 76 is a movable partition or floating piston 76a which may be packed as at 76b. Of course, any suitable equivalent such as a diaphragm or membrane separating the liquid from the gas within the cylinder may be substituted for the partition 76a. The liquid-containing portion 75a is thus in constant communication with the interior of the controlling cylinder 74 and the gas-containing portion 78a is placed in communication as by means of the conduit 78b with the air pocket or flexible container 78 arranged between the chassis 77 and the axle 81 of the vehicle. The pocket or bag 78 may, of course, be reinforced with a metallic reinforcing ring 79 and provided with a filling valve 80.

In Figure 6 of the drawings there is illustrated a slightly modified form of construction in which substantially identical parts are given the same reference designations as in Figure 5. However, in this embodiment the conduit 75 leading from the liquid-containing cylinder 74 passes into an elastic internal pocket 82 disposed within the pneumatic spring pocket or bag 83, the liquid within the sac 82 serving to expand and contract the sac and thus control the pressure within the pneumatic spring pocket 83 in substantially the same way as provided by the cylinder 76 in the embodiment illustrated in Figure 5.

In the various cases in which the spring consists of a pneumatic pocket, the latter being usually of a substantial diameter and inflated to relatively low pressure, such as those used in the tires of the vehicle, the pump which is employed for feeding the load-compensating device, can be merged in function with the conventional lubricating oil pump of the engine, which pump usually operates at pressures reaching an order of magnitude of three or even four kilograms.

In Figure 7 of the drawings there is illustrated a further modification of the invention in which the pneumatic side of the installation resembles in some phases both the features of Figure 5 and Figure 6. The pneumatic spring pocket indicated at 90 is connected by means of the conduit 91 with the air chamber 92 of the cylinder 93 wherein is disposed the hydraulic fluid sac 94 which is in communication by means of the conduit 95 with the interior of the cylinder 96 of the piston and cylinder control member.

The pneumatic spring 90 and also the piston and cylinder apparatus are disposed between the chassis 100 and the wheel mounting 101 in the usual way. The piston 102 having a rod 103 passing through the packed end 104 of the cylinder 96 is of a rather small height, approximating the general configurations of the shock absorber pistons employed, for example, in my earlier United States Patents Nos. 2,719,612 and 2,748,898, the passageways 105 and 106 passing through the piston being suitably controlled for compression and rebound movements by means of suitable flexible disc valves. This particular embodiment of the invention is diagrammatically illustrative of a way in which the effective height of the piston, so far as the simultaneous closure of the inlet conduit opening 110 and the outlet conduit opening 111 are concerned, is attained by providing an extended cylindrical sleeve 112 secured to the piston and operating with sliding contact or with leak clearance in connection with the inner wall of the cylinder in the ways previously described herein, the effective height of the piston including the sleeve 112 of course being greater than the distance between the openings 110 and 111.

The embodiment illustrated in Figure 8 of the drawings involves a fluid pressure liquid distributor of the same character as those already described, and the same reference numerals are applied to the several parts thereof as in Figures 5–7 inclusive. Between the chassis structure illustrated in part at 77 and the wheel mounting or axle structure, a part of which is shown at 81, there is disposed a spring device designated generally by the reference numeral 120 which comprises the lower enveloping cylinder portion 121 and an upper inner cylinder portion 122 telescoping therewith. The upper portion of the cylinder section 122 communicates with the pressure liquid containing portion of the regulator 74 by means of the conduit 75 and a movable partition or floating piston 124 is adapted to reciprocate within the cylinder section 122 and separate the lower gas-containing zone 125 of the arrangement 120 from the upper pressure liquid containing zone 126. The respective cylinder sections comprising the device 120 may be secured to the chassis and wheel mounting as by means of the bolts 128 and 129.

The embodiment illustrated in Figure 9 of the drawings differs only from that shown in Figure 8 by the utilization of a pressure liquid sac 130 which carries a volume of liquid 131 within its interior. The other parts are the same as in Figure 8 and are designated accordingly.

In the variation of the invention shown in Figure 10 of the drawings a combined "spring" and controlling or distributing structure designated generally by the reference numeral 150 is interposed between the chassis part 77 and the axle portion 81. This arrangement comprises the upper enveloping cylinder portion 151 which telescopes with an inner lower cylinder portion 152, these portions being secured respectively to the chassis 77 and the axle 81. Suitable packing arrangements indicated diagrammatically at 154 serve to prevent leakage between the two cylinder parts. The cylinder-and-piston regulator device employed in this example is disposed within the two cylinder parts and is designated generally by the reference numeral 174, the cylinder containing working fluid and having a piston 174a disposed therein which piston is connected by means of the piston rod 174b to the axle part 81. The upper end of the cylinder 174 is rigid with the cylinder portion 151 of the spring. An inlet duct 174c and an outlet duct 174d are provided analogous to the ones described in connection with the other embodiments. A flexible sac 160 is arranged within the telescoping cylinder combination 150 so as to envelop the control cylinder area and provide a separation between an outer zone of pressure gas 162 and an inner zone of pressure liquid 163, the pressure liquid being supplied in a regulated manner, as previously described, from the device 174, as through the aperture 166.

In the device shown in Figure 10 the distributor constitutes a shock absorber as well as controlling means for the pneumatic spring.

Of course, the opposite arrangement could be adopted in which the air pocket is disposed on the inside of the assembly and the pressure liquid zone on the outside.

In these latter embodiments, the liquid serves not to transmit the load but only to assure the pressure variation according to the load and the inverse variation of pressure on the air or gas of the pneumatic spring which is a consequence thereof.

It may be also noted that in these latter embodiments for certain purposes the distance between the inlet and outlet orifices for the pressure liquid in the cylinder of the control and distributor device does not necessarily have to be less than the height of the piston, this distance may be the same or even greater than that dimension.

In general, instead of operation by the opening of normally closed orifices, there can be admitted a constant flow during the balancing period, and provide the compensation by the closing of these orifices. Thus, the device may comprise control of only one of the orifices by the piston, namely, either the admission or the discharge orifice, the other orifice being of constant flow. Such a system can operate properly whenever the orifices are dimensioned in such a manner that the flow through the permanently open orifice is less than the flow through the control orifice when the latter is uncovered by the piston.

Various changes and alterations may be made in the embodiments of the invention illustrated and described herein without departing from the scope of the invention as defined by the following claims.

Having thus described the invention, what is claimed as new and desired to be secured by Letters Patent is:

1. A combined hydraulic and pneumatic suspension device for vehicles or like machines having two relatively movable parts one resiliently supported by the other, such as the chassis and wheel mounting of a motor vehicle, said suspension device comprising a chamber of variable volume disposed in resilient supporting relation between the parts so as to expand and contract according to the relative movements of said parts, a body of compressed gas in said chamber, means for varying the basic pressure of said gas in the chamber according to variations in the load sustained, said means including a hydraulic cylinder and piston device adapted to function as a direct-acting hydraulic suspension and shock absorber, the cylinder of said device being secured to one of the relatively moving parts and a piston rod connected at one end to the piston of said device and the other end being secured to the other of said parts, a quantity of pressure liquid in said cylinder within which liquid said piston is adapted to relatively move and to displace liquid from one side of the piston to the other and thus damp the relative movements of said parts, restricted by-pass means leading from one side of the piston to the other to accommodate the displacement of liquid in either direction but at the same time enhance the shock absorber function of the piston and cylinder device, means for transmitting pressure from the hydraulic liquid on the compression side of the hydraulic suspension and shock absorber piston to the body of gas in the said resilient suspension chamber, a source of hydraulic liquid under pressure, an input conduit placing the interior of said cylinder in communication with said source, a return conduit for liquid from said cylinder to said source, the orifices of both of said conduits within the cylinder being disposed within the ambit of said piston for selective control of flow through said orifices according to the position of said piston relatively to said cylinder responsive to varying load conditions.

2. The combined hydraulic and pneumatic suspension device as set forth in claim 1 in which the piston in the direct-acting hydraulic shock absorber and suspension device is provided with resilient valve controlled by-pass passageways constituting the said by-pass means, whereby the shock absorbing function of the device is facilitated in addition to its function as means for controlling the pressure gas suspension.

3. The suspension device as set forth in claim 1 in which the orifices opening into the cylinder portion from said conduits are spaced apart axially of the cylinder portion a distance which is somewhat less than the axial height of said piston.

4. The suspension device as set forth in claim 1 in which the orifices of said conduits open through the wall of the cylinder portion and the ends of said piston are tapered adjacent the periphery thereof.

5. The combined hydraulic and pneumatic suspension device as set forth in claim 1 in which said conduits open through a head of the working chamber of said cylinder, and there are provided elongated axially extending projections from said head, openings through said piston accommodating relative sliding movement between the piston and said projections, the piston rod being hollow and provided with a duct leading from the interior thereof to the interior of the cylinder, ducts in said depending projections and openings from said ducts spaced apart a predetermined distance with relation to the axial distance between the top of said piston and the hollow interior of the piston rod, whereby said piston structure regulates the passage of pressure liquid into and out of said cylinder and thus the distribution of pressure liquid to said gas container.

6. The suspension device as set forth in claim 1 in which said gas chamber and said hydraulic shock absorber comprise a single member, a floating partition being provided within the cylinder portion separating an upper pressure gas containing chamber from the lower working liquid chamber in which the piston moves, said gas containing chamber containing only gas, the piston rod being of relatively large diameter whereby the entire member may serve as a complete suspension element.

7. The suspension device as set forth in claim 1 in which the gas chamber and the said cylinder are separated spacially and there is provided an intermediate chamber one end of which is in communication with the pressure gas container and the other end in communication with the liquid chamber of the hydraulic shock absorber, and a separator is disposed within said chamber between the gas and liquid occupied portions thereof, said separator adapted to be displaced at least partially according to the variation in relative volume of said gas and liquid content.

8. The suspension device as set forth in claim 7 in which the separator is a floating partition-piston.

9. The suspension device as set forth in claim 7 in which the partition is a flexible diaphragm.

10. The suspension device as set forth in claim 1 in which a sac is disposed within the chamber comprising the gas pressure holder and communication is afforded between the hydraulic shock absorber cylinder and said sac for the introduction of pressure liquid into said sac and thus control the functioning of the gas suspension chamber.

References Cited in the file of this patent

UNITED STATES PATENTS

| | | |
|---|---|---|
| 1,861,821 | Schaum | June 7, 1932 |
| 1,974,171 | Bizzarri | Sept. 18, 1934 |
| 2,249,530 | Kollsman | July 15, 1941 |
| 2,554,581 | Levy | May 29, 1951 |
| 2,620,182 | Marston et al. | Dec. 2, 1952 |
| 2,687,311 | Nailinger | Aug. 24, 1954 |
| 2,756,046 | Lucien | July 24, 1956 |
| 2,774,446 | Bourcier de Carbon | Dec. 18, 1956 |

FOREIGN PATENTS

| | | |
|---|---|---|
| 1,092,457 | France | Nov. 10, 1954 |
| 945,674 | Germany | July 12, 1956 |